Nov. 30, 1926.　　　　　　　　　　　　　　　　　　　　1,608,601
J. R. KELLER
APPARATUS FOR FEEDING MOLTEN GLASS
Filed May 13, 1921
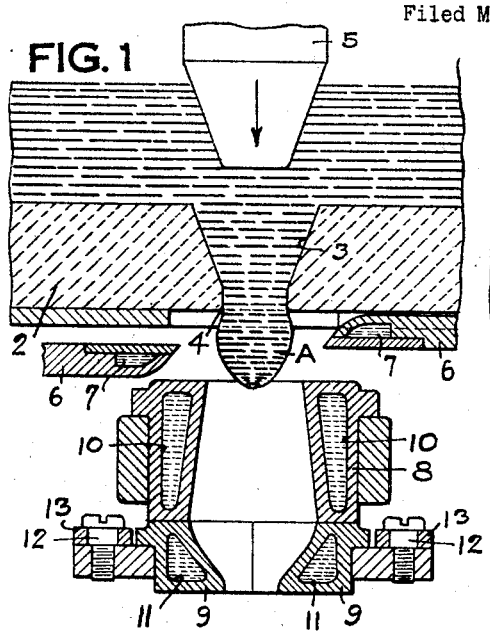
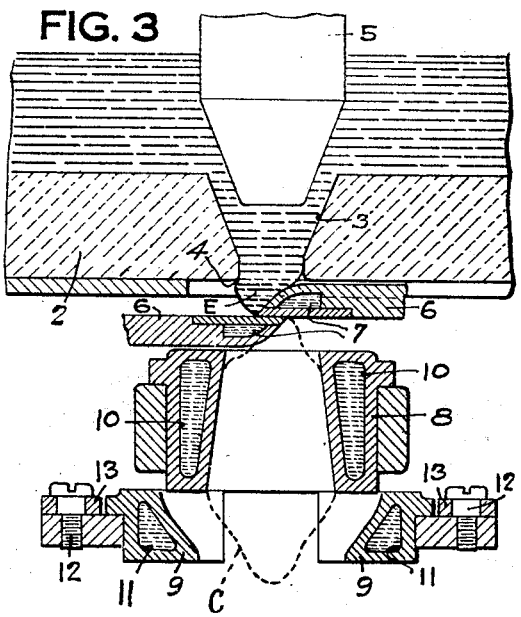
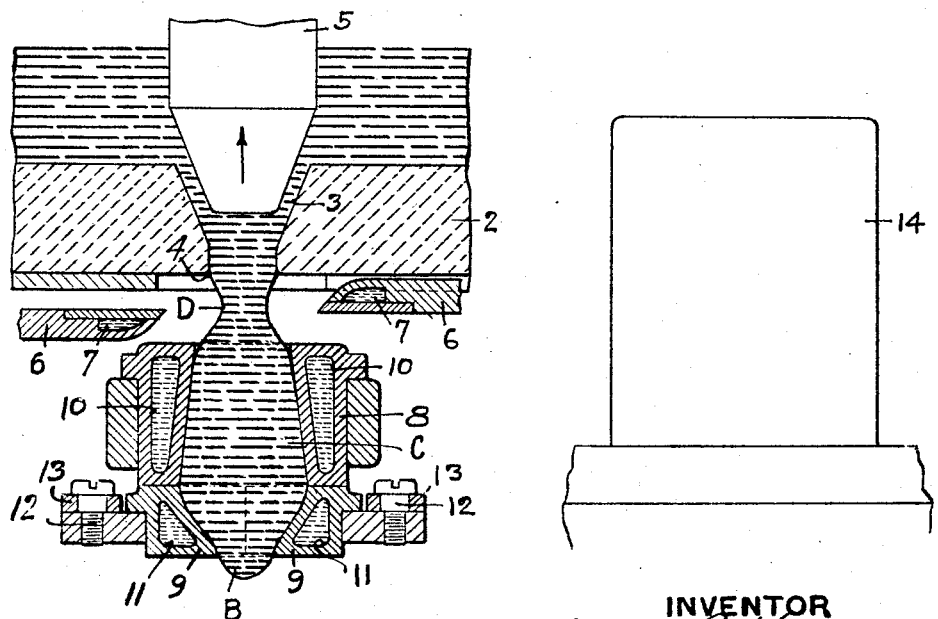
INVENTOR
John R. Keller,
By Kay, Totten & Brown
Attorneys Patented Nov. 30, 1926.

1,608,601

UNITED STATES PATENT OFFICE.

JOHN R. KELLER, OF CARNEGIE, PENNSYLVANIA, ASSIGNOR, BY MESNE ASSIGNMENTS, TO HARTFORD-EMPIRE COMPANY, OF HARTFORD, CONNECTICUT, A CORPORATION OF DELAWARE.

APPARATUS FOR FEEDING MOLTEN GLASS.

Application filed May 13, 1921. Serial No. 469,125.

This invention relates to the separation of molten glass into individual masses for the purpose of forming bottles, pressed ware, sheets or other final shapes, and it has particular reference to the art of feeding molten glass in discontinuous masses or gobs, as distinguished from glass feeding methods wherein the glass is delivered from a receptacle continuously in a flowing stream and the individual masses are separated without interruption of the flowing stream.

In the art of drop feeding or gob feeding, to which my present invention relates, it is customary to provide a receptacle for the molten glass having a downwardly opening discharge orifice and to provide within the receptacle some sort of vertical reciprocating impulse device, such, for example, as a plunger which operates to augment the natural gravity flow of the glass during a part of the formation of the drop or gob and which, during another part of its reciprocation, neutralizes or entirely overcomes the gravity flow and thus provides a pause in the flow of the glass sufficient for the transfer of molds or other shaping mechanism.

My present invention is not concerned with the particular means or methods by which the glass is conveyed to the discharge orifice and caused to issue therefrom, but relates specifically to the shaping of the gather or gob after it issues from the discharge orifice. I accomplish this shaping by the use of a shaping member in the nature of a receptacle which is interposed below the suspended gather, and also below the shears or other severing devices which separate each gather from the parent body of glass. In the specific embodiment of my invention herein shown and described, this shaping receptacle consists of a cup having a continuously open bottom and formed in sections which are periodically moved to catch the descending gather and retard its fall, and thereafter to release the gather and permit it to drop into the mold. This retarding and shaping receptacle differs from the gathering cups which have heretofore been employed for feeding glass, in that my retarding device, because of its continuously open discharge orifice, never completely checks the flow of the gather, and in the second place, in that my retarding device operates on the gather below the severing shears. My present method therefore consists in forming a descending gather of glass and shaping it by checking its descent, as distinguished from accumulating a descending stream of glass in a receptacle and then emptying the receptacle.

My invention is of special utility in the formation of gobs or gathers of considerable weight. The glass feeding mechanisms heretofore employed have been successful in forming gathers weighing but a few ounces, but when the articles to be formed are such that the gathers must weight several pounds, as in the manufacture of large battery jars which may weigh as much as eight or ten pounds, it is found that the suspended gather will elongate into a stream between the shears and the mold, thus losing the advantages of uniformity in temperature and shape which are produced by the gob feeding system. My present invention remedies this defect by checking the descent of the gather between the shears and the mold, and causing the gather to retain its proper shape until it is finally received in the mold.

The advantages secured by my present invention are, among others, the following:

1. The shape of the gob or gather is improved.

2. The temperature of the gob or gather is so controlled as to better adapt it to the later operations.

3. The weight of the gather is more accurately controlled and variations in weight in ordinary working conditions are reduced to a minimum.

4. The range of sizes and weights which this type of apparatus is capable of making is extended.

5. The range of temperature in the mass at which it is possible to form gobs or gathers is extended.

6. The range of speed at which the gobs or gathers are formed is extended.

In the accompanying drawing, Fig. 1 is a vertical sectional view of a portion of a glass feeding device constructed in accordance with my invention, the necessary power connections being omitted and the glass being shown shortly after the feeding operation has commenced; Fig. 2 is a similar view showing the condition of the gather when completed and Fig. 3 is a similar view showing the condition of the gather at the instant when it is released from the retarding device.

In the drawing the numeral 2 designates a receptacle for molten glass which may consist of a forehearth connected to a tank furnace, and which, as shown, is provided with a discharge orifice 3 having a downwardly opening outlet 4. An impulse member, which in this case is a plunger 5, is disposed above the discharge orifice 3 and is reciprocated toward and from the discharge orifice by suitable means, not shown.

Below the outlet 4 of the discharge orifice 3, and spaced a suitable distance therefrom, is a pair of severing shears 6 which may be of any well known or desired construction, and which may be provided with passages 7 for the circulation of water for cooling.

Below the shears 6 is a retarding and shaping receptacle consisting of an upper portion 8, which is relatively stationary, and a lower portion which is formed by the coaction of two or more movable sections 9. The upper stationary portion 8 of the receptacle is provided with passages 10 for the circulation of cooling water, and the sections 9 of the lower portion of the receptacle may likewise be provided with passages 11 for the same purpose. The sections 9, as shown, are attached by means of suitable pins 12 to slides 13 by means of which the sections 9 may be moved from the closed position shown in Fig. 1 to the open position shown in Fig. 3, any ordinary or desired power connections being provided for reciprocating the slides 13. A mold 14, which may be of any desired shape, is shown in Fig. 3 beneath the discharge orifice and the retarding device.

The operation of feeding glass according to my invention may best be described by referring in turn to Figs. 1, 2 and 3. In Fig. 1 the plunger 5 is shown in its raised position and the glass issues from the outlet 4 of the discharge orifice 3 in the form of a rounded drop, indicated at A, Fig. 1. When the plunger descends it exerts an impulse upon the glass at the discharge orifice which causes the glass to issue suddenly in the form of a cylinder having a pointed lower end. The lower end of the gather, upon reaching the bottom of the retarding receptacle, is checked by contact between its sides and the walls of the lower sections 9 of the receptacle, the point of the gather being unsupported, as shown at B, Fig. 2. The proportions of the parts are such that the gather continues to issue from the outlet 4 after the lower end of the gather is checked by the retarding receptacle, and the gather therefore expands to fill the receptacle and assumes the shape shown at C, Fig. 2. The plunger then rises, and when it has risen to the position shown in Fig. 2 its pull upon the glass in contact with the plunger produces an attenuation immediately opposite to the shearing line of the shears 6, this attenuation being indicated at D, Fig. 2. The shears are so timed that they close and sever the gather, as shown in Fig. 3, and at approximately the same moment the sections 9 which compose the lower part of the retarding receptacle are drawn apart, as shown in Fig. 3, thus releasing the gather B and permitting it to fall freely into the mold 14. The continued upward movement of the plunger 5 retracts the protruding stub E which remains above the shears and causes this stub to be reheated and incorporated in the parent mass of glass in the discharge orifice 3.

The operation described above may be varied by placing the retarding receptacle far enough below the discharge outlet 4 so that the gather is completely formed and separated before the lower end of the gather reaches the retarding receptacle. In that case the receptacle checks the fall of the gather temporarily and partially, the end of the gather being free to work its way through the continuously open discharge outlet from the receptacle, and the gather being shortened by the descent of its upper portion while its lower portion is checked by the receptacle. In such a case the lower portion of the receptacle need not be made in sections, or if made in sections the sections need not be moved, the gather being allowed to work its way through the opening in the gather until the diameter of the receptacle is reduced to the diameter of the outlet, when the gather will fall quickly and freely into the mold. When the retarding cup is thus employed it operates in the manner set forth and claimed in the application for Letters Patent filed May 25, 1921, by George E. Howard, Serial No. 472,587.

It is essential that the lower portion of the receptacle be formed with downwardly and inwardly tapering walls, and that the upper end of the receptacle be of greater diameter than the discharge orifice from the tank. The upper walls of the receptacle may taper upwardly and inwardly, as shown in the accompanying drawing, or may be vertical, as desired, the exact shape of the receptacle depending on the shape to be imparted to the gather, which in turn depends on the shape of the mold, it being desired that the shape of the gather be brought as closely as possible to the shape and size of the mold before being placed therein.

Molten glass, like any other viscous liquid, tends, when suspended in drops or gathers, to assume a pear-shaped form under the action of gravity and surface tension. While this shape may be modified through the use of various kinds of impulse means, such as the plunger mentioned above, it is difficult to obtain definite and predetermined shapes and still carry out the operation at various temperatures and at various speeds. The temperature of a gather and the speed of formation of successive gathers are important features in feeding molten glass, and they change the viscosity of the glass and its friction in passing through an opening very materially. Therefore, while simple impulse means, such as the plunger herein shown, may produce a gather of the correct artificial shape desired, it may be necessary for this purpose that the glass be at such a temperature or formed at such a speed that the glass will stretch and elongate before the shears sever it from the parent body. This is especially true when the gather is of considerable weight and may result in changing the properly shaped gather to a stream which will trickle into the mold and there overlap, forming a non-homogeneous and unevenly cooled mold charge. If, however, the lower portion of the mold charge is temporarily held back, as described above, while the plunger descends and forces the proper charge through the outlet from the container, the proper shape of the gather will be retained and may, in addition, be modified by the shape of the delaying cup. By controlling the time during which the fall of the gather is delayed and by changing the configuration of the delaying cup and the distance of the cup from the outlet 4 of the receptacle 2, it is possible to control the shape of the gather within a very wide range.

My present invention operates to control not only the shape of the gather, but also its temperature. When a gather becomes so heavy that it elongates and trickles down into the mold, the front or beginning of the gather is exposed to the cooling action of the atmosphere during practically the whole cycle of operation, whereas the back end or upper part of the gather issuing later from the container is formed from hotter glass taken from a point further inside the container, and is thus exposed a much shorter time to cooling influences. In such a case the gather is hotter in its upper portion than in its lower portion.

In forming most articles, especially bottles and hollow-ware, and more specifically in forming that class of bottles termed "narrow-neck bottles," it is essential that the point or lower end of the gather be relatively hot, and the sides somewhat cooler, for the reason that the point of the gather forms the neck or finish of the bottle and chills more readily than the other portions of the blank.

In the method here disclosed the point of the gather does not come in contact with the delaying cup and remains hot, while the sides of the gather are slightly chilled by contact with the cup, especially if the cup is water-cooled, and thus the average temperature of the gather as it leaves the cup is well adapted for fabricating bottles of the kind mentioned above.

If the temperature of the glass in the receptacle fluctuates, as it may do despite all precautions, the viscosity of the glass will likewise be altered and the weight of the gathers will tend to change. This fluctuation is reduced by the use of my delaying cup which checks the fall of the gather and preserves its shape and size, and consequently its weight. A similar advantage results when the temperature of the glass is intentionally changed, the distance between the discharge orifice and the delaying cup being adjusted to compensate for the change in temperature of the glass.

Another advantage of my invention is that the molds may be placed at a greater distance below the discharge orifice from the tank than in ordinary gob-feeding machines. In any forming machine it is desirable that the mold be placed considerably below the glass feeding orifice so as to give plenty of room for the shears and for the usual deflector below the shears which carries the gather away to the cullet pile whenever the forming machine is stopped during the operation of the feeder. For this and other reasons of convenience the molds are preferably placed a considerable distance below the feeding orifice, but in ordinary gather feeders the molds cannot be lowered as far as is often desirable. When the delaying cup herein shown is used, however, it makes no great difference how far the molds are placed below the feeding orifice, as the shape of the gathers will depend merely upon the feed and upon the shape and operation of the delaying cup.

It is to be understood that the accompanying drawing is largely diagrammatic and is intended merely to illustrate one of the many kinds of apparatus by which my invention may be carried into practice, and I desire that my invention be construed as covering all such changes and adaptations as fall within the scope of the appended claims.

I claim as my invention:

1. Apparatus for feeding molten glass comprising a receptacle for molten glass having a downwardly opening discharge orifice, shears disposed below the said discharge orifice, and a shaping receptacle disposed below the said shears, the said receptacle being composed of two superposed portions, the lower portion having downwardly converging inner walls and means for cooling said shaping receptacle.

2. Apparatus for feeding molten glass comprising a receptacle for molten glass having a downwardly opening discharge orifice, shears disposed below the said discharge orifice, a shaping receptacle disposed below the said shears, the said receptacle being composed of two superposed portions, the lower portion having downwardly converging inner walls and being composed of separable sections, and means for cooling said shaping receptacle.

3. Apparatus for feeding molten glass comprising a receptacle for molten glass having a downwardly opening discharge orifice, shears disposed below the said discharge orifice, and a shaping receptacle disposed below the said shears, the said receptacle being composed of two superposed sections, the lower portion having downwardly converging inner walls and being composed of separable sections, and means for supplying cooling fluid to the walls of the said receptacle.

In testimony whereof, I the said JOHN R. KELLER have hereunto set my hand.

JOHN R. KELLER.